Oct. 23, 1934.   R. F. BEERS   1,977,615
MAGNETIC STEERING INDICATOR
Filed Dec. 22, 1928    3 Sheets-Sheet 1

INVENTOR
Roland F. Beers
By
Ezekiel Wolf
ATTORNEY

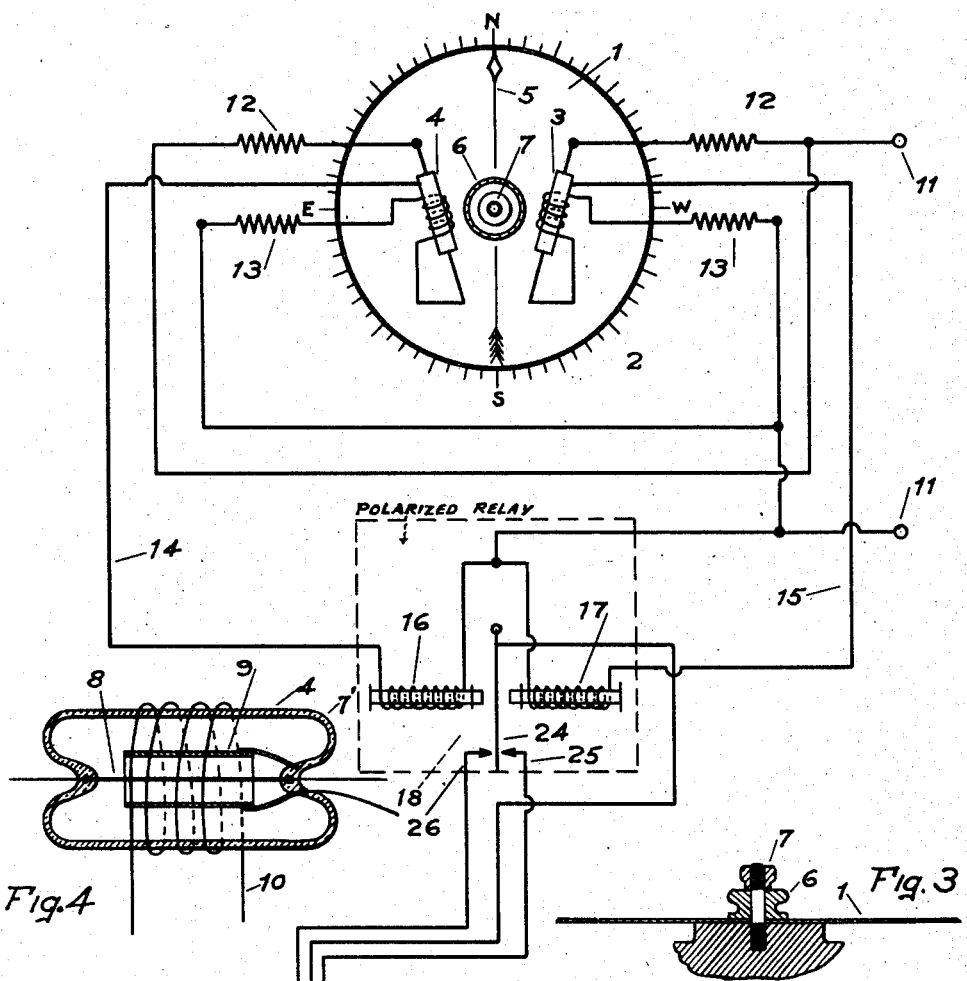
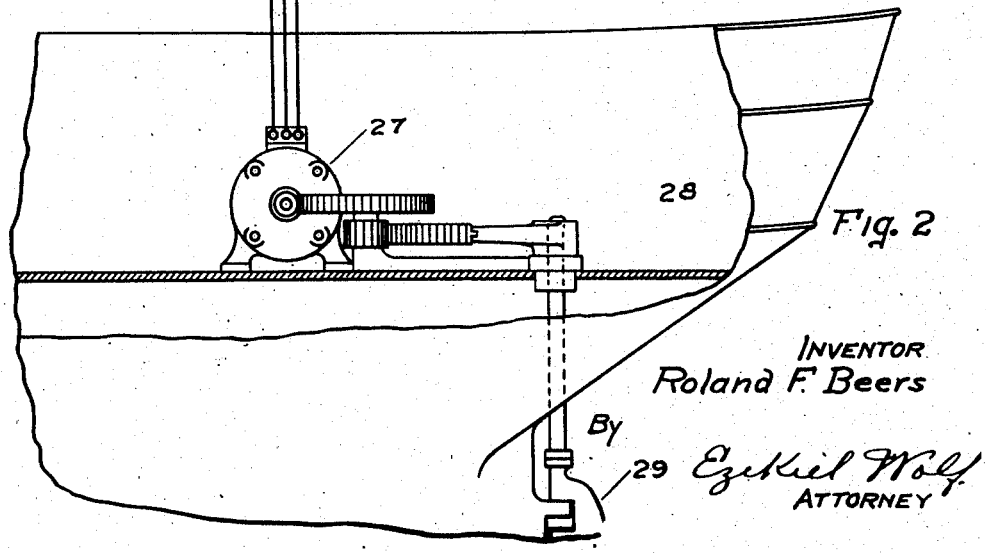

Oct. 23, 1934.    R. F. BEERS    1,977,615
MAGNETIC STEERING INDICATOR
Filed Dec. 22, 1928    3 Sheets-Sheet 3

INVENTOR
Roland F. Beers
By
Ezekiel Wolf
ATTORNEY

Patented Oct. 23, 1934

1,977,615

UNITED STATES PATENT OFFICE 1,977,615

MAGNETIC STEERING INDICATOR

Roland F. Beers, Belmont, Mass., assignor to Submarine Signal Company, Boston, Mass., a corporation of Maine Application December 22, 1928, Serial No. 327,991

9 Claims. (Cl. 33—204)

The present invention relates to means for steering or navigating vessels or aircraft. In particular, it relates to such means in which a so-called magnetron tube is employed to indicate the deviation of the vessel or aircraft from its course.

Various means have been employed to indicate the course and compass directions. The oldest is perhaps the mariners' magnetic compass. There is also at the present time another type commonly known as the earth inductor compass.

In the present invention no moving parts are necessary. There is no need of driving a coil to generate a voltage by cutting the lines of force in the earth's field. Further, the apparatus is light, does not need to be delicately mounted and, in addition, provides indicating means which might be used directly to control an indicating device or a relay for operating a steering mechanism.

The advantage of the present mechanism is especially great over other compasses in its application to aircraft navigation though it has other advantages which make it preferable to other types of compasses for other uses.

The objects and purposes of the present invention will be noted in the following description of the embodiment of the invention and in the drawings taken in connection with the description. In the drawings:

Figure 2 shows a modification of the invention for automatically steering a vessel;

Figures 3 and 4 show details of construction;

Figure 1:
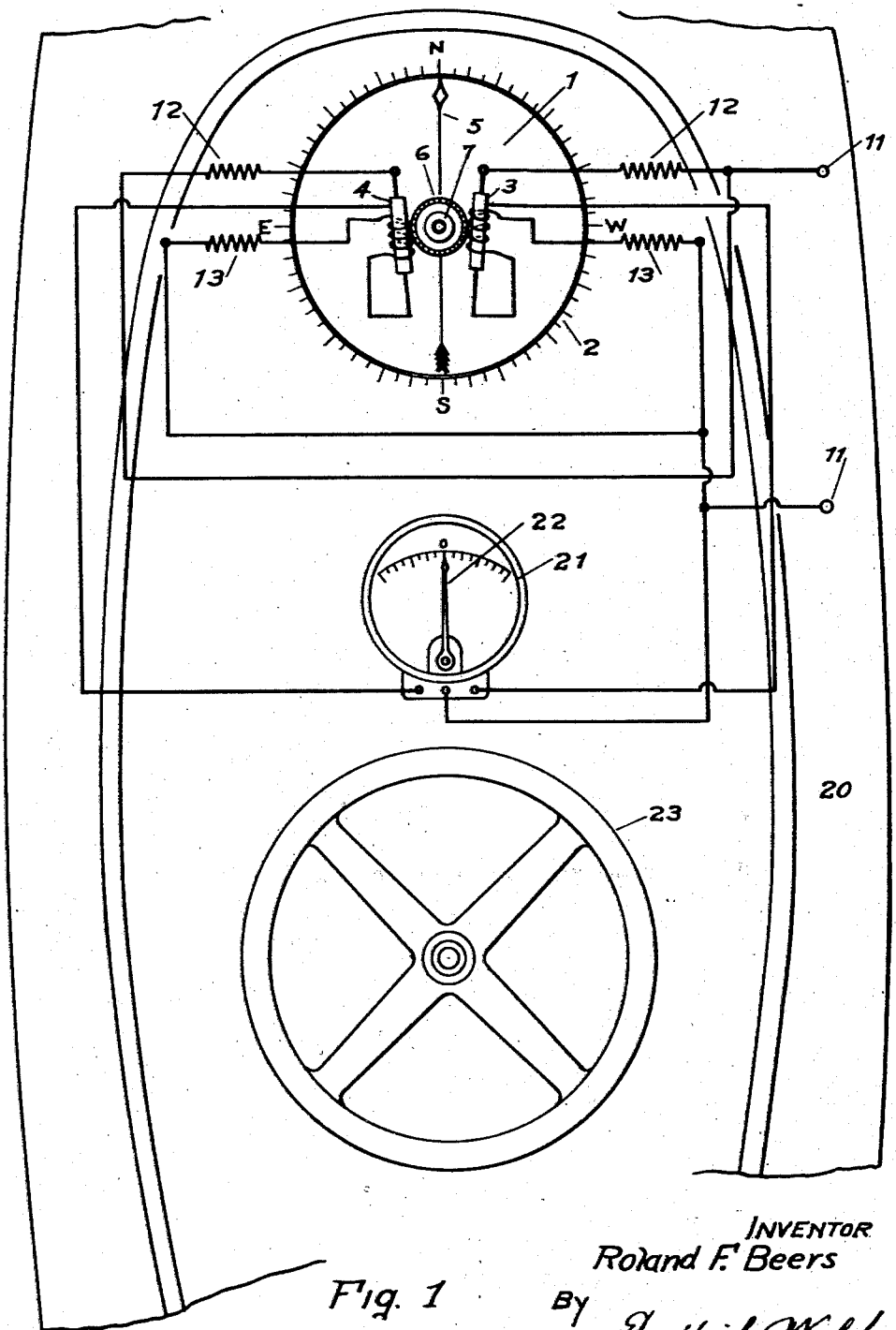
Figure 1 shows a schematic layout of the invention applied to aircraft navigation.

In Figure 1 there is provided a rotatable plate 1, rotatable within a circularly marked dial 2, indicating compass directions except that east and west marks are reversed as in the surveyor's transit instrument. The plate has an indicating arrow 5 indicating the setting of the plate with reference to the dial, which in Figures 1 and 2 is north and south. The plate 1 may be rotated and placed in any desired position by means of the knob 6 attached to the plate, and may further be clamped in position by means of the clamping unit 7, as shown in Figure 3.

Upon the plate are mounted, as shown in Figure 1, two tubes 3 and 4 with the axis of the tubes preferably at the same angle with the indicating arrow. The axis of the tube is the center lien perpendicular to the electron flow from the filament to the plate of the tube. In the present case it may be taken as coinciding with the filament 8. This angle is about 7½°.

As shown in Figure 4, the tube comprises a glass vessel 7 having a hot wire filament 8 passing axially through the middle of the tube. Concentric with the filament is a metal hollow cylinder 9, while surrounding the tube externally is a winding 10.

The filament 8 serves as the cathode, while the cylinder 9 is the anode, the tube within being almost entirely evacuated as the usual thermionic tube. However, the space within the tube may be filled with conductive gases at proper pressures. This type of tube is not new in the art. It has in the past been called a magnetron tube, since the electron flow is controlled by a magnetic field. In the present application the word magnetron will be used to designate a device as described above in which the electron flow is controlled by a magnetic field.

The filament 8 is heated from the power source 11 by the series circuit comprising the resistance 12, the filament 8, the winding 10 and the resistance 13, all connected in series and shunted across the line 11. The resistances 12 and 13 are given the correct value to bring the line potential across 11 to the value where the filament of the magnetron tube will be properly heated. The magnetron tube may be designed so that these resistances may be omitted or the potential across the line 11 may initially be made the correct value. As will be noticed, this same heating current also supplies the direct current field excitation for the winding 10. This direct current excitation may, however be obtained in any other suitable manner, as for instance by a separate potentiometer connected across the line.

The plates 9 of the tubes are placed at a positive potential with respect to the filaments of the tubes by means of the power source. In the plate circuits 14 and 15 are the two windings 16 and 17 respectively of the polarized relay 18. The operation of the tube in the present case is such that when the direction of the earth's field with reference to the tube changes, the plate current circuit changes and operates the balanced relay one way or the other.

Figure 5:
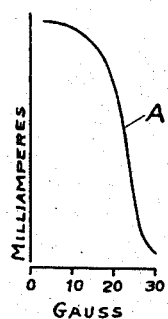
Figures 5 and 6 show curves of the electrical characteristics of the apparatus.
Figure 6:
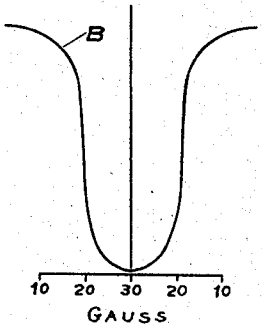

This will be seen more clearly on consideration of the curves shown in Figures 5 and 6. In Figure 5, the curve A represents the change in the plate current flowing with a change in the magnetizing field for a constant plate voltage and filament current. It will be noted that as the field strength increases the cut off of the field strength is rather sharp. As shown in the figure at 20 gauss the slope of the curve is almost a straight line and very steep. It is this position of the curve where it is most desirable to work, as a very small change in field strength means a very large change in plate current.

In Figure 6, the curve B shows the combination of two tubes working together, as when the direction of the earth's field tends to increase the current in one tube and decrease it in the other. The winding 10 is designed and employs such values of currents that the tubes are operated on the steepest of the characteristics. That is the winding 10 is used to create a constant magnetic field which brings the operation of the tube in the variation of the earth's magnetic field in the most desirable portion of the plate current field strength characteristic.

When for instance, the plane 20, as indicated in Figure 1, turns to the right, the magnetizing field in the tube 3 tends to decrease and consequently the plate current increases, assuming, of course, that initially the plane was directed with the arrow running parallel to the earth's field.

Likewise at the same time the plate current in the tube 4 tends to decrease, since the magnetizing field is increasing. This decrease of plate current in the tube 4 and increase in the tube 3 is made to operate the indicating mechanisms 21, which may be a unipivot galvanometer or any suitable device operated by differential action of the magnetrons 3 and 4. When the plane turns to the right the indicator 22 swings to the right and the operator knows, therefore, that he must turn the rudder control 23 counter clockwise to bring the indicator back to its zero position.

In the modifications shown in Figure 2, the change in plate current of the magnetron tubes unbalances the relay 18 and moves the reed 24 to the right or left, making contacts with either the contact 25 or 26, thus making the steering motor 27 turn right or left to swing the rudder 29 of the boat 28 in the desired direction.

In the operation of either modification the course is set initially by placing the disc 1 so that the arrow reads in the direction of the desired course. Under these conditions, to have a zero reading of the indicator 21, the earth's field will have to be parallel to the arrow and the angle of the north-south line and the arrow will be the course of the aircraft or vessel. If the arrow, for instance should be turned to E, the earth's field with respect to the aircraft would run this way and the longitudinal axis of the aircraft would actually be directed to the east. The course would thus be east.

While the change of plate current is sufficient to operate an electrical instrument such as a galvanometer, indicated in Figure 1, nevertheless, if larger instruments are desired, an amplifier of the push-pull type may be used before the indicator, or, in fact, any amplifier,—but a push-pull amplifier may, in some cases, be more effective.

Figure 7:
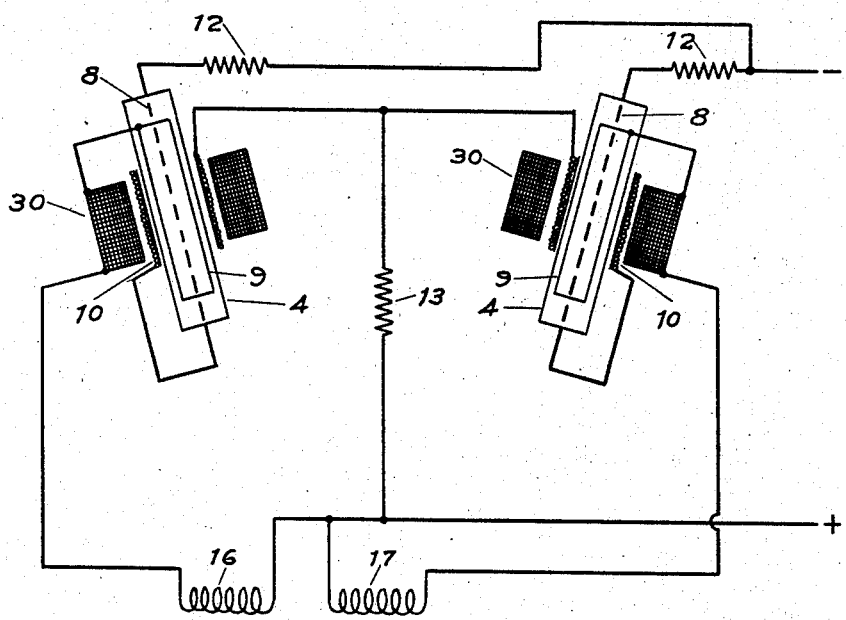
Figure 7 shows a modification in part of the device shown in Figures 1 and 2.

In Figure 7 is shown an effective method of increasing the effect of the earth's magnetic field. Here an additional winding 30 is provided which is in the plate circuit of the tubes, although it may be inductively, capacitively or resistively coupled with the plate circuit or by some other feed back method to obtain the desired effect. Since the tube impedance is very high, the unit 30 may have a high impedance without seriously affecting the plate circuit itself. The effect of the winding 30 is to produce a magnetizing field which aids the earth's magnetizing field in this case; that is, either strengthening it or weakening it in the direction of the effect desired. This method is exceedingly effective in obtaining a more sensitive device and giving a sharper indication of the change of the earth's magnetic field with the change in position of the magnetron tube.

It will be seen that the present type of compass, as it may be called, has no moving parts and depends entirely upon the effect of the earth's field in changing the flow of electrons from the filament to the plate of the magnetron tube.

Two tubes are preferably used, but more may be, and they are positioned with an angle of about 7½° between the axis of the tube and the arrow or, in other words, the axes of the tubes are at about an angle of 15° with each other. At this angular deviation, the tubes may be made most critical to changes with respect to the earth's field running parallel to the bisector of the angle between the tubes. As soon as the aircraft or vessel goes off its course, the plate currents of the tubes become unbalanced and, in fact, to the same extent, since the characteristic of the tubes is a straight line in the portion where the tubes are being operated.

While in the figures shown, this unbalancing is used to operate a polarized relay or unipivot galvanometer, it may be used in most any suitable type of circuit to give a proper indication. This indication will, moreover, always be positive and unique in its indication, since each tube must work in the opposite direction from the other for proper indication; that is, when the plate current in one tube is increasing, that in the other must be decreasing.

Having now described my invention, I claim:

1. A device for indicating the direction of the earth's field comprising at least two magnetron tubes, positioned normally symmetrically with respect to the earth's field, and means operated by the differential action of the increase of electron flow in one tube and the decrease in the other tube when the symmetry with the earth's field is disturbed for indicating a deviation from the normal position of said tubes.

2. A device for indicating when a craft is on its correct magnetic course comprising a rotatable disc, a plurality of magnetron tubes mounted on said disc, a circular scale concentric with the axis of said disc for setting said disc with reference to said scale means for establishing an electron flow in said magnetron tubes, indicating means for indicating the variation in electron flow in said tubes when the craft deviates from its correct course and means associating said indicating means with said magnetron tubes for operating said indicating means to indicate the deviation of said craft from its magnetic course.

3. A device for indicating when a craft is on its correct magnetic course comprising a rotatable disc, a plurality of magnetron tubes mounted on said disc, balanced windings in the respective plate circuits of the magnetron tubes, means for setting said disc in any desired direction with reference to said craft, means for establishing an electron flow in said magnetron tubes indicating means for indicating the variation in electron flow in said tubes when the craft deviates from its correct course, said means operated by said balanced windings for indicating by the differential change of current in said windings when said craft has deviated from the magnetic course set.

4. A device for indicating when a craft is on its correct magnetic course comprising a rotatable disc for setting set course by rotation of the disc relative to the craft, a plurality of magnetron tubes mounted on said disc, said tubes having surrounding windings to produce an initial magnetic field, indicating means and means associating said indicating means with said magnetron tubes whereby a change in the plate current of said magnetron tubes may operate said indicating means and produce an indication when said craft is not on its set course.

5. A device for indicating when a craft is on its correct magnetic course comprising a rotatable disc, a plurality of magnetron tubes mounted on said disc, electrical flux production means adapted to produce an initial magnetic field of sufficient magnitude to operate said tubes at a point in its characteristic where a small change in magnetic flux produces a large change in plate current, an indicator, and an electric circuit connecting said tubes with said indicator for indicating a change from the effect of the earth's magnetic field, when said craft has deviated from its desired course.

6. Means for indicating a deviation from a given magnetic course comprising a plurality of magnetron tubes having fixed positions relative to one another but movable relative to the earth's magnetic field, means for causing an electron stream to flow in each of said tubes from the filaments to the plates thereof, a balanced relay means connected to said tubes and means operated thereby for producing an indication of the deviation.

7. Means for indicating a deviation from a given magnetic course comprising a plurality of magnetron tubes having fixed positions relative to one another but movable relative to the earth's magnetic field, means for causing an electron stream to flow in each of said tubes from the filaments to the plates thereof, a balanced indicator, electrical means connecting the balanced indicator with said tubes, at least one of said plurality operating the indicator in one direction of a center and the other in the other direction thereof.

8. Means for indicating a deviation from a given magnetic course comprising a plate having mounted thereon two magnetron tubes having their axes at an angle to each other, said plate being concentric with a compass scale, an indicator having a center zero balance, means for causing an electron flow in said tubes and means connecting said tubes to said indicator to cause a swing to the right or left of the zero balance when the electron flow is varied by the change in the position of the plate with respect to the earth's field.

9. A device for indicating the direction of the earth's field comprising at least two magnetron tubes, means mounting said tubes so that they may be positioned with their axes at a definite angle with the earth's magnetic field and means operated by the change in electron flow within said tubes to produce an indication of the deviation of said tubes from their normal position with reference to the earth's field when such change occurs.

ROLAND F. BEERS.